(12) United States Patent
Springer

(10) Patent No.: US 12,659,287 B1
(45) Date of Patent: Jun. 16, 2026

(54) REPLACING EMAIL ADDRESSES WITH PROJECT-SPECIFIC EMAIL ADDRESSES

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/307,351

(22) Filed: Apr. 26, 2023

(51) Int. Cl.
*H04L 51/48* (2022.01)
*G06Q 10/107* (2023.01)
(Continued)

(52) U.S. Cl.
CPC ........... *H04L 51/48* (2022.05); *G06Q 10/107* (2013.01); *H04L 51/02* (2013.01); *H04L 51/214* (2022.05)

(58) Field of Classification Search
CPC ....... H04L 51/212; H04L 51/48; H04L 67/52; H04L 67/01; H04L 67/535; H04L 67/1046; H04L 67/54; H04L 9/40; H04L 51/234; H04L 51/23; H04L 67/02; H04L 67/306; H04L 69/329; H04L 51/58; H04L 67/04; H04L 69/08; H04L 45/04; H04L 67/63; H04L 51/214; H04L 51/56; H04L 47/2408; H04L 63/20; H04L 67/34; H04L 45/308; H04L 51/42; H04L 63/0428; H04L 45/00; H04L 63/083; H04L 12/2856; H04L 51/066; H04L 63/08; H04L 45/306; H04L 67/125; H04L 51/222; H04L 63/102; H04L 51/00; H04L 51/04; H04L 63/0236; H04L 63/0407; H04L 63/0421; H04L 63/06; H04L 67/53; H04L 51/18; H04L 61/30; H04L 63/101; H04L 63/126; H04L 63/18; H04L 51/224; H04L 61/106; H04L 61/45; H04L 63/0471; H04L 63/123;
(Continued)

(56) References Cited

U.S. PATENT DOCUMENTS

| | | | |
|---|---|---|---|
| 7,818,455 | B2 | 10/2010 | Haffner |
| 8,782,184 | B2 | 7/2014 | Furlong et al. |

(Continued)

FOREIGN PATENT DOCUMENTS

| | | | | |
|---|---|---|---|---|
| EP | 1024447 | A2 | * 8/2000 | ............. G06Q 10/10 |
| WO | 2016156858 | A1 | 10/2016 | |

*Primary Examiner* — Djenane M Bayard
(74) *Attorney, Agent, or Firm* — Young Basile Hanlon & MacFarlane, P.C.

(57) ABSTRACT

A system may determine, based on a communication between at least a first internal user that is internal to an organization and an external user that is external to the organization, that the communication is associated with a project record. The system may replace, before transmitting the communication, an email address of the first internal user with a project-specific email address that is linked to the project record and the first internal user. In some implementations, the system may transmit the communication from the project-specific email address to the external user and copy the communication to the project record. In some implementations, the system may receive a reply to the communication from the external user and forward the reply to the email address of the first internal user and a second email address of a second internal user.

20 Claims, 9 Drawing Sheets

(51) Int. Cl.
*H04L 51/02* (2022.01)
*H04L 51/214* (2022.01)

(58) Field of Classification Search
CPC ... H04L 9/3236; H04L 9/3247; H04L 63/104; H04L 41/06; H04L 63/10; H04L 63/1416; H04L 67/1044; H04L 41/0816; H04L 41/0886; H04L 41/145; H04L 43/062; H04L 51/216; H04L 63/1408; H04L 63/1425; H04L 63/1433; H04L 63/1441; H04L 63/1491; H04L 12/1895; H04L 51/10; H04L 63/0227; H04L 9/0618; H04L 67/146; H04L 69/18; H04L 63/0442; H04L 63/0823; H04L 51/52; H04L 63/1475; H04L 63/1483; H04L 67/1097; H04L 51/043; H04L 69/22; H04L 67/10; H04L 51/046; H04L 51/02; H04L 51/226; H04L 67/12; H04L 1/0009; H04L 41/16; H04L 43/0876; H04L 1/0003; H04L 2101/622; H04L 2101/672; H04L 45/122; H04L 5/0048; H04L 61/10; H04L 63/0263; H04L 43/028; H04L 47/10; H04L 51/063; H04L 51/08; H04L 43/0894; H04L 67/60; H04L 61/4523; H04L 63/0281; H04L 63/145; H04L 63/1466; G06F 40/169; G06F 3/04842; G06F 21/16; G06F 40/103; G06F 40/106; G06F 40/166; G06F 40/197; G06F 40/242; G06F 40/284; G06F 40/30; G06F 16/148; G06F 16/27; G06F 16/9535; G06F 16/9536; G06F 21/53; G06F 2221/033; G06F 3/0482; G06F 40/40; G06F 9/485
See application file for complete search history.

(56) References Cited

U.S. PATENT DOCUMENTS

| | | | |
|---|---|---|---|
| 9,342,818 | B2 | 5/2016 | Lawrence-Apfelbaum |
| 9,619,436 | B2 | 4/2017 | Lu |
| 9,723,034 | B2 | 8/2017 | Yeung et al. |
| 10,445,706 | B2 | 10/2019 | Kitada et al. |
| 10,732,802 | B2 | 8/2020 | Siu et al. |
| 10,764,434 | B1* | 9/2020 | Yoskowitz ............. H04L 61/45 |
| 10,922,660 | B2 | 2/2021 | Rakshit et al. |
| 10,972,429 | B2 | 4/2021 | McIsaac et al. |
| 11,184,312 | B1 | 11/2021 | Yoskowitz et al. |
| 11,824,905 | B2 | 11/2023 | Opoku-Agyemang et al. |
| 2004/0203949 | A1* | 10/2004 | Nielsen ................... H04L 51/48 |
| | | | 455/466 |
| 2006/0026438 | A1 | 2/2006 | Stern et al. |
| 2008/0104175 | A1 | 5/2008 | Keohane et al. |
| 2009/0049132 | A1 | 2/2009 | Livne Gutovski |
| 2012/0236348 | A1* | 9/2012 | Ochi .................... G06Q 10/107 |
| | | | 358/1.13 |
| 2014/0074536 | A1 | 3/2014 | Meushar et al. |
| 2015/0378995 | A1 | 12/2015 | Brown et al. |
| 2016/0357761 | A1* | 12/2016 | Siracusa ................ G06N 20/00 |
| 2016/0360336 | A1* | 12/2016 | Gross .................... H04W 4/025 |
| 2018/0115506 | A1* | 4/2018 | Inamo .................. H04L 61/301 |
| 2019/0080115 | A1 | 3/2019 | Dongre et al. |
| 2020/0382455 | A1* | 12/2020 | Fasoli ................... H04L 51/214 |
| 2021/0083998 | A1* | 3/2021 | Bastide ................ H04L 51/214 |
| 2022/0100497 | A1* | 3/2022 | Mansour .................. G06F 8/71 |
| 2022/0121778 | A1* | 4/2022 | Padgett ................ G06F 16/958 |
| 2023/0129849 | A1* | 4/2023 | Lazim .................... G06F 40/30 |
| | | | 715/205 |
| 2024/0362594 | A1 | 10/2024 | Ramsey et al. |

* cited by examiner

500

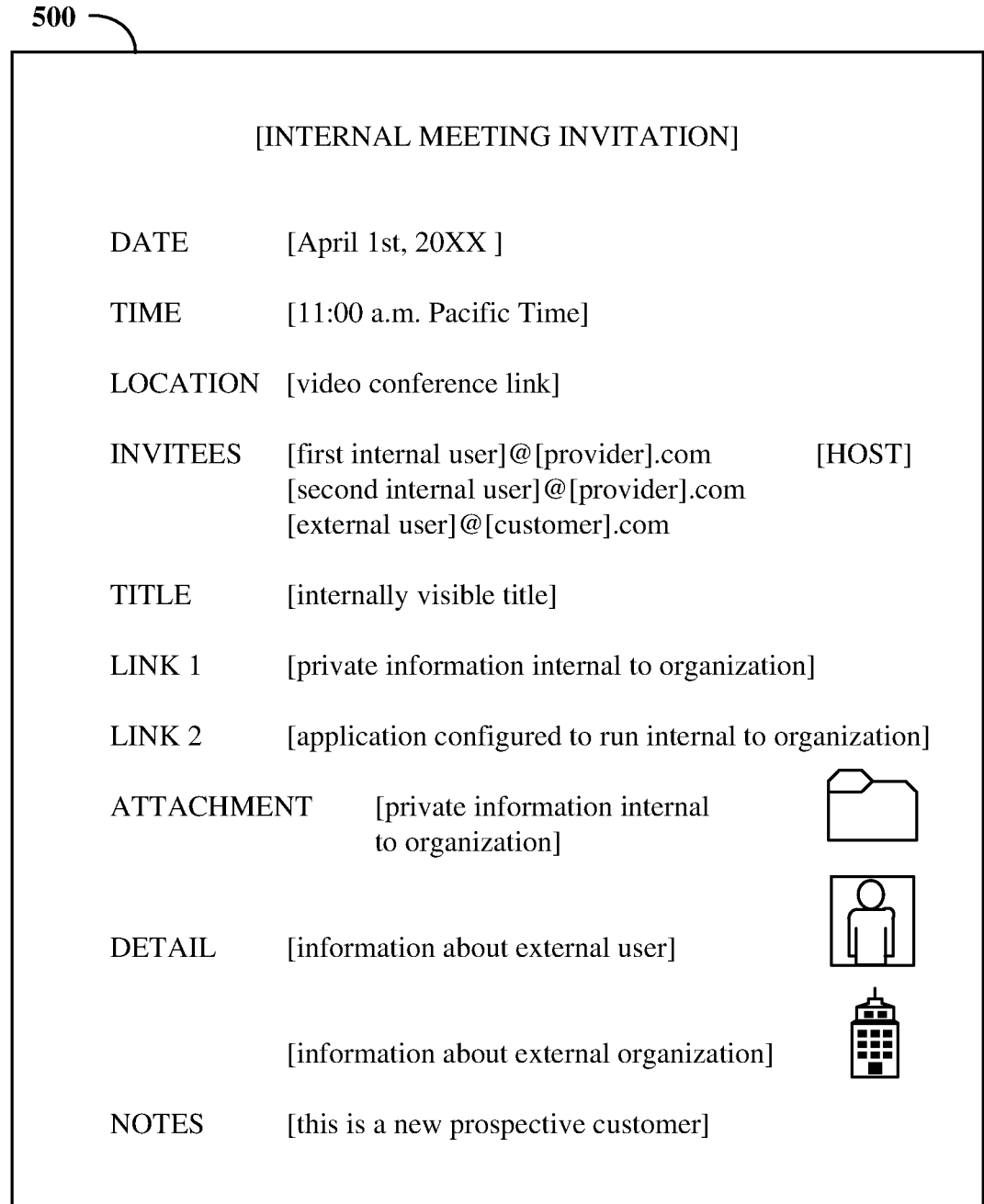

[INTERNAL MEETING INVITATION]

DATE          [April 1st, 20XX ]

TIME          [11:00 a.m. Pacific Time]

LOCATION   [video conference link]

INVITEES     [first internal user]@[provider].com          [HOST]
             [second internal user]@[provider].com
             [external user]@[customer].com TITLE         [internally visible title]

LINK 1        [private information internal to organization]

LINK 2        [application configured to run internal to organization]

ATTACHMENT      [private information internal
                to organization]

DETAIL        [information about external user]

[information about external organization]

NOTES         [this is a new prospective customer]

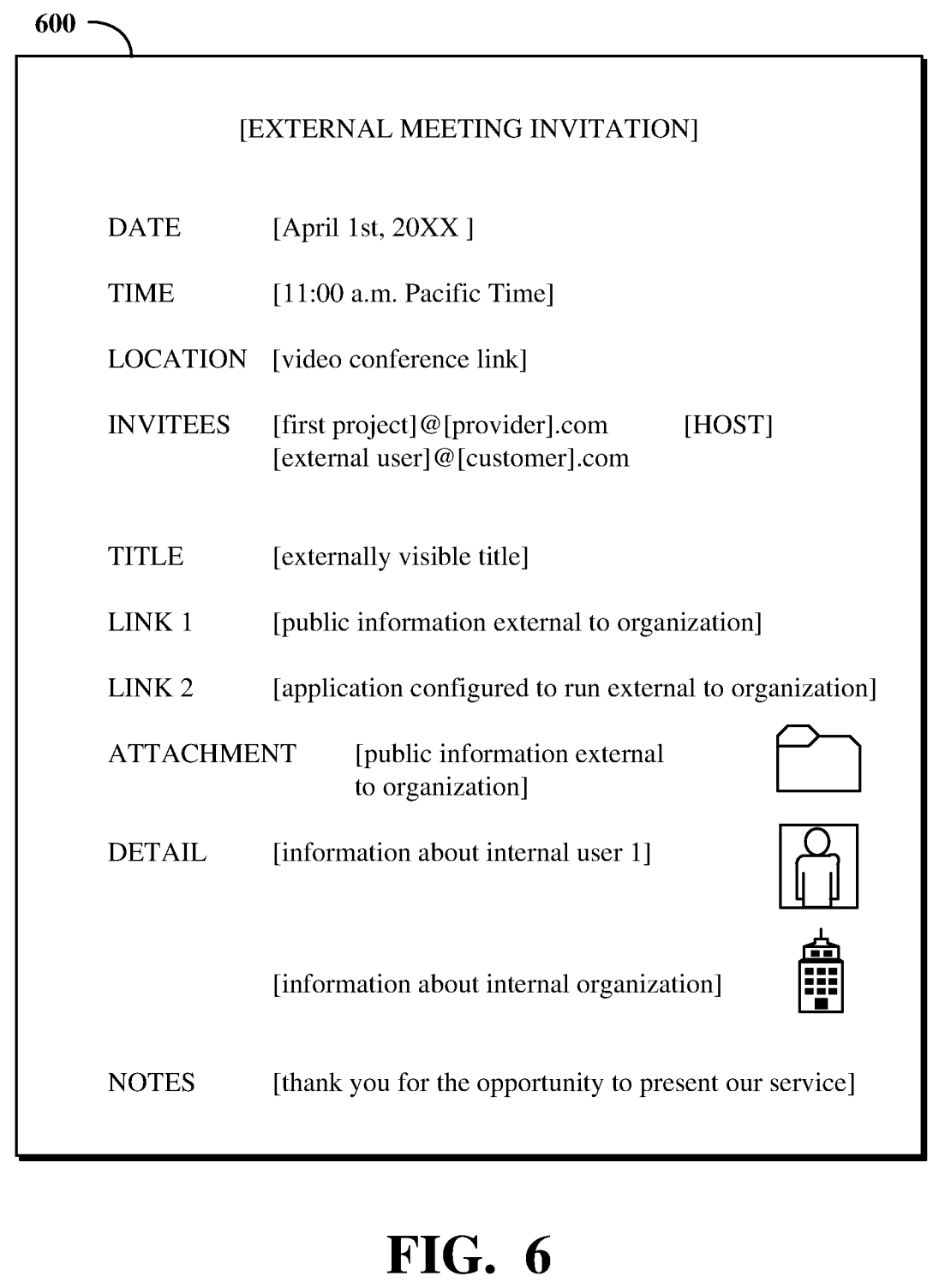

[EXTERNAL MEETING INVITATION]

DATE          [April 1st, 20XX ]

TIME          [11:00 a.m. Pacific Time]

LOCATION    [video conference link]

INVITEES     [first project]@[provider].com          [HOST]
             [external user]@[customer].com TITLE         [externally visible title]

LINK 1        [public information external to organization]

LINK 2        [application configured to run external to organization]

ATTACHMENT      [public information external
                to organization]

DETAIL        [information about internal user 1]

[information about internal organization]

NOTES         [thank you for the opportunity to present our service]

FIG. 6

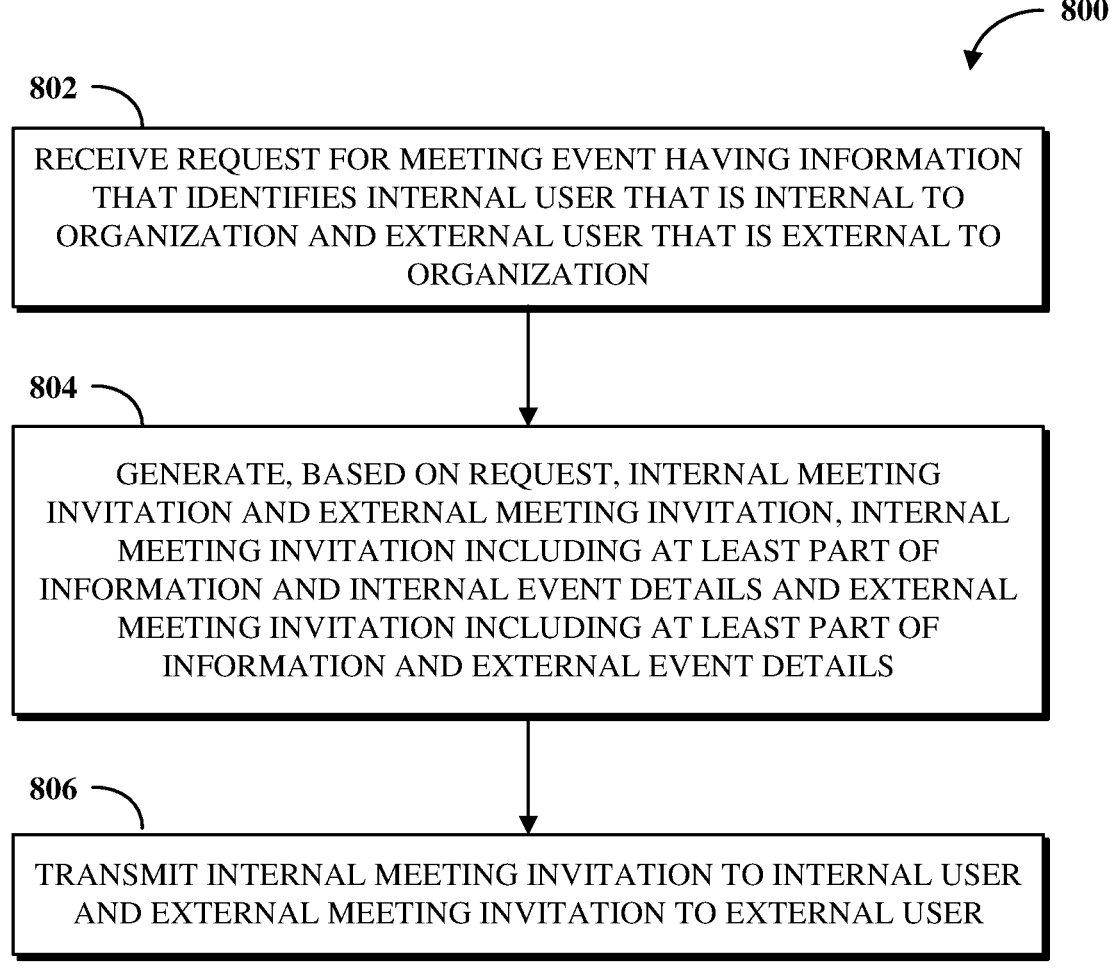

800

802

RECEIVE REQUEST FOR MEETING EVENT HAVING INFORMATION THAT IDENTIFIES INTERNAL USER THAT IS INTERNAL TO ORGANIZATION AND EXTERNAL USER THAT IS EXTERNAL TO ORGANIZATION

804

GENERATE, BASED ON REQUEST, INTERNAL MEETING INVITATION AND EXTERNAL MEETING INVITATION, INTERNAL MEETING INVITATION INCLUDING AT LEAST PART OF INFORMATION AND INTERNAL EVENT DETAILS AND EXTERNAL MEETING INVITATION INCLUDING AT LEAST PART OF INFORMATION AND EXTERNAL EVENT DETAILS

806

TRANSMIT INTERNAL MEETING INVITATION TO INTERNAL USER AND EXTERNAL MEETING INVITATION TO EXTERNAL USER

FIG. 8

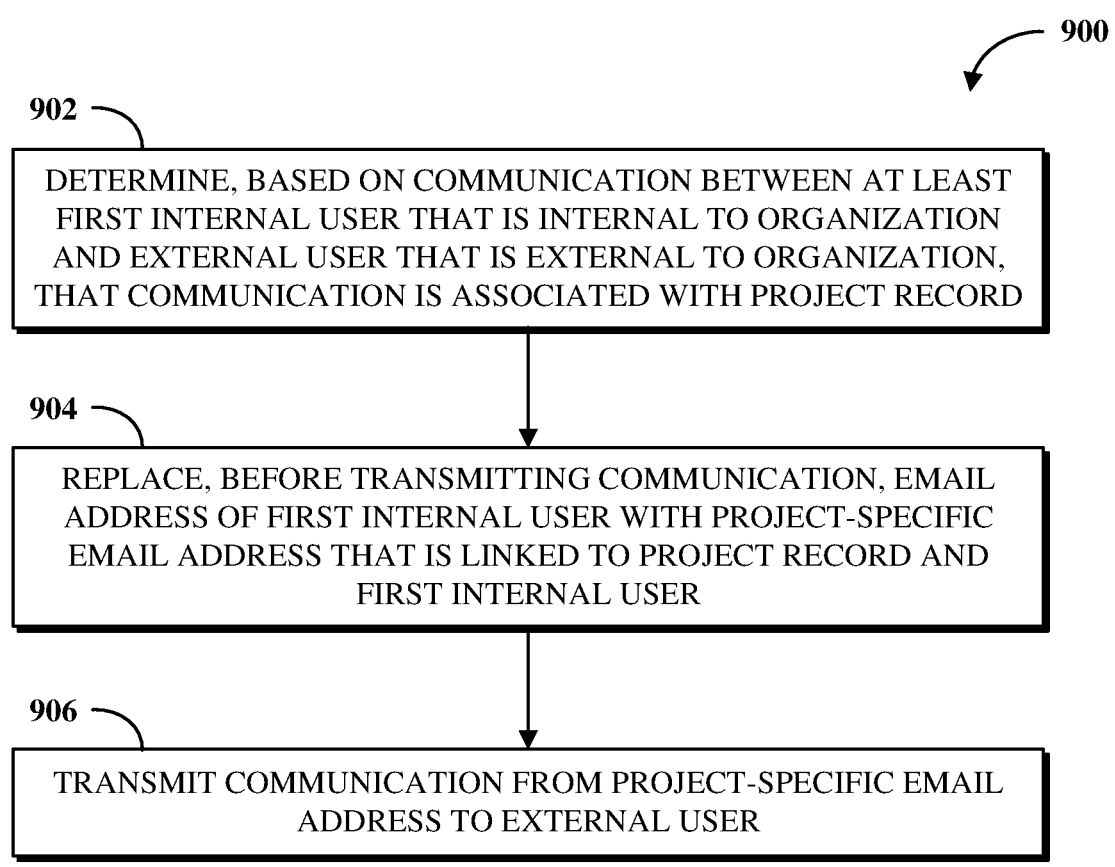

900

902
DETERMINE, BASED ON COMMUNICATION BETWEEN AT LEAST FIRST INTERNAL USER THAT IS INTERNAL TO ORGANIZATION AND EXTERNAL USER THAT IS EXTERNAL TO ORGANIZATION, THAT COMMUNICATION IS ASSOCIATED WITH PROJECT RECORD

904
REPLACE, BEFORE TRANSMITTING COMMUNICATION, EMAIL ADDRESS OF FIRST INTERNAL USER WITH PROJECT-SPECIFIC EMAIL ADDRESS THAT IS LINKED TO PROJECT RECORD AND FIRST INTERNAL USER

906
TRANSMIT COMMUNICATION FROM PROJECT-SPECIFIC EMAIL ADDRESS TO EXTERNAL USER

FIG. 9

REPLACING EMAIL ADDRESSES WITH PROJECT-SPECIFIC EMAIL ADDRESSES

FIELD

This disclosure relates generally to video conferences and, more specifically, to replacing email addresses with project-specific email addresses.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 5 is an illustration of an example of an internal meeting invitation.

FIG. 6 is an illustration of an example of an external meeting invitation.

FIG. 8 is a flowchart of an example of a technique for generating internal and external meeting invitations.

FIG. 9 is a flowchart of an example of a technique for replacing email addresses with project-specific email addresses.

DETAILED DESCRIPTION OF THE DRAWINGS

Figure 1:
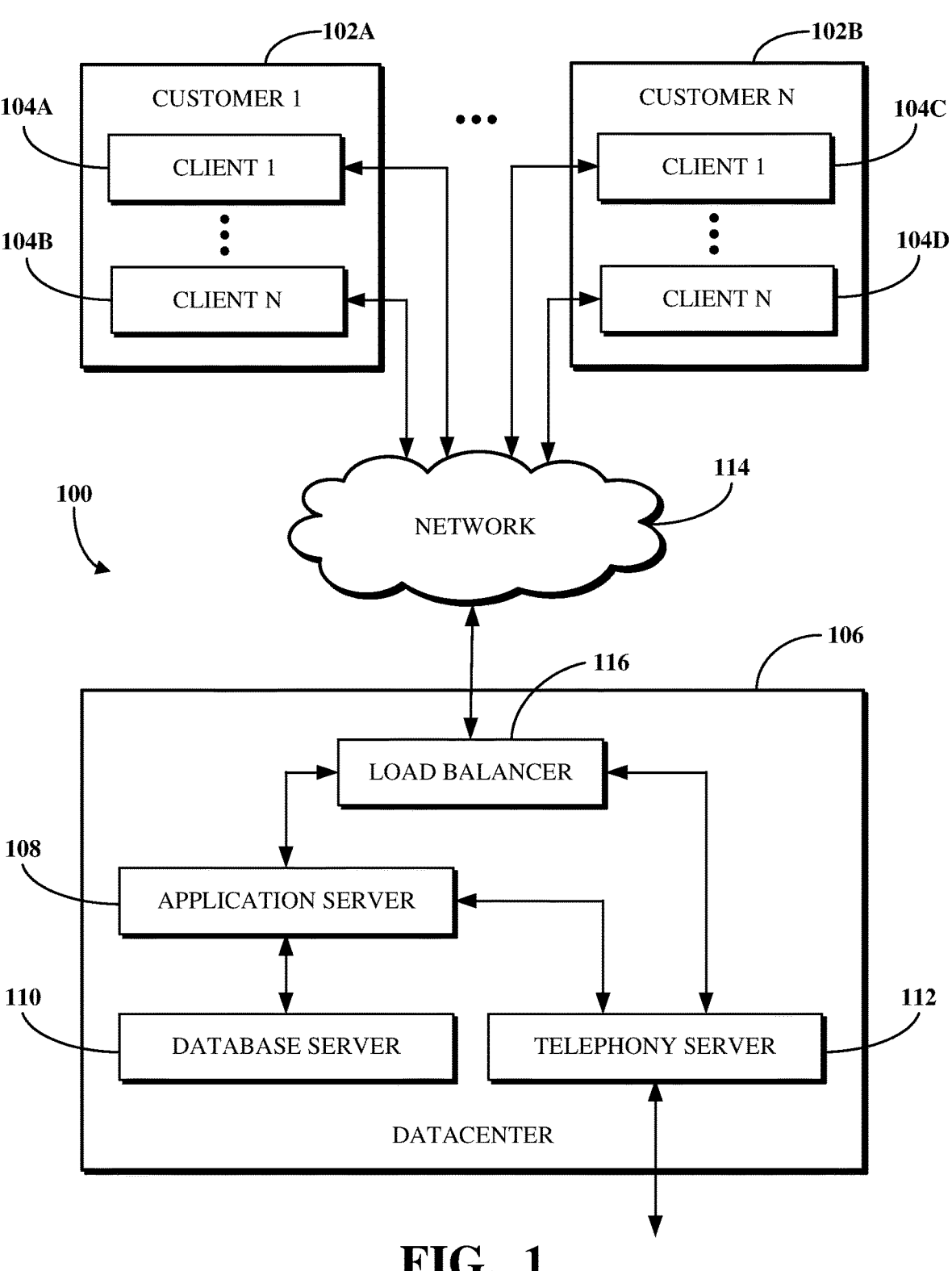
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

Individuals internal to an organization (e.g., employees and others working for a company) may use software, such as of a UCaaS platform or otherwise, to support individuals external to the organization (e.g., vendors, customers, or guests of the company). For example, the internal users may use email and calendar software, such as those of UCaaS and other software platforms, to communicate with the external users and conduct meetings with the external users (e.g., video conferences). However, conventional email software may be inadequate in various circumstances due to its technical design approaches. For example, when a first internal user (e.g., an account representative) copies a second internal user (e.g., a subject matter expert) on a message to an external user (e.g., a customer) processed using conventional email software, the external user may unintentionally reply to one internal user without copying the other. Also with conventional email software, when the first internal user or the second internal user leaves the project associated with external user, and/or a third internal user (e.g., an alternative subject matter expert or a replacement) joins the project, the external user may continue to send messages to the second internal user and/or not send messages to the third internal user, for example, because they are unaware of the third internal user's relation to the project and/or that the second internal user is no longer working on the project. These circumstances may cause inefficiencies in supporting the external user and the project.

Conventional calendar software may also be inadequate in various circumstances. For example, when the first internal user (e.g., the account representative) sends a calendar or meeting invitation to the second internal user (e.g., the subject matter expert) and the external user (e.g., the customer) to discuss the project, with conventional calendar software the invitation may be genericized to include a date, a time, and information (e.g., an agenda) for the internal and external users to equally consume. Including more detailed information in the invitation for the internal user to consume might not be appropriate for the external user (e.g., the organization's proprietary information), and including more detailed information in the invitation for the external user to consume might be irrelevant and a distraction to the internal user (e.g., background about the organization). With only genericized information in the meeting invitation, the second internal user and the external user may not receive adequate information to prepare for the meeting. This may also cause inefficiencies in supporting in the project.

Implementations of this disclosure address problems such as these by separating internal and external meeting invitations for a same meeting event to enable deeper insights for internal and external users. This may enable a controlled experience that distinguishes between the needs of the internal and external users (e.g., a two-headed meeting invite). Some implementations may include a software system that receives a request for a meeting event. For example, an internal user (e.g., internal to the organization) may initiate the request through a graphical user interface (GUI). The request for the meeting event may include information, such as a date, a time, a location, and/or invitees that identify an internal user and an external user (e.g., external to the organization). The system can generate, based on the request for the meeting event, an internal meeting invitation and an external meeting invitation. The internal meeting invitation may include at least part of the information (e.g., the date, time, and location) and internal event details. For example, the internal event details may include an internally visible title, a link or an attachment that provides private information that is internal to the organization, a link to an application configured to run internal to the organization, and/or information about the external user or external organization. The external meeting invitation may include at least part of the information (e.g., the same date, time, and location) and external event details that are different from the internal event details. For example, the external event details may include an externally visible title, a link or an attachment that provides public information that is external to the organization, a link to an application configured to run external to the organization, and/or information about the internal user or the organization. The system can then transmit the internal meeting invitation to the internal user and the external meeting invitation to the external user for a same meeting event. As a result, the internal meeting invitation may be tailored to internal users to enable the internal users to prepare for the meeting in one way (e.g., to explain a product or service), and the external meeting invitation may be tailored to external users to enable the external users to prepare for the same meeting in another way (e.g., to inquire about the product or service).

Implementations of this disclosure may also address one or more of the aforementioned problems by enabling an ephemeral alias for internal users that may be included in communications, such as emails or meeting invitations (e.g., task aliases). The task alias may enable internal users to align in their support of external users, and/or may enable the internal users to efficiently enter and/or exit projects supporting the external users. Some implementations may include a software system that can determine, based on a communication between at least a first internal user that is internal to the organization and an external user that is external to the organization, that the communication is associated with a project record. For example, the system can identify the external user in the project record, or a project identifier associated with the project record in the communication. In some implementations, the system can prompt the internal user through a GUI to confirm that the communication is associated with the project record before proceeding further. The system can then replace, in the communication and before transmitting the communication, an email address of the first internal user with a project-specific email address that is linked to the project record and the first internal user. As a result, a reply that is sent to the project-specific email address may be forwarded to the first internal user, and in some cases a second internal user, and/or may be copied to the project record. Also, a reply that is sent to the project-specific email address may be forwarded to relevant internal users, regardless of a substitution of one internal user for another (e.g., the first internal user leaving the project, and the second internal user joining the project), such as by changing a property associated with the project-specific email address.

To describe some implementations in greater detail, reference is first made to examples of hardware and software structures used to implement a system for generating internal and external meeting invitations and/or replacing email addresses with project-specific email addresses. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
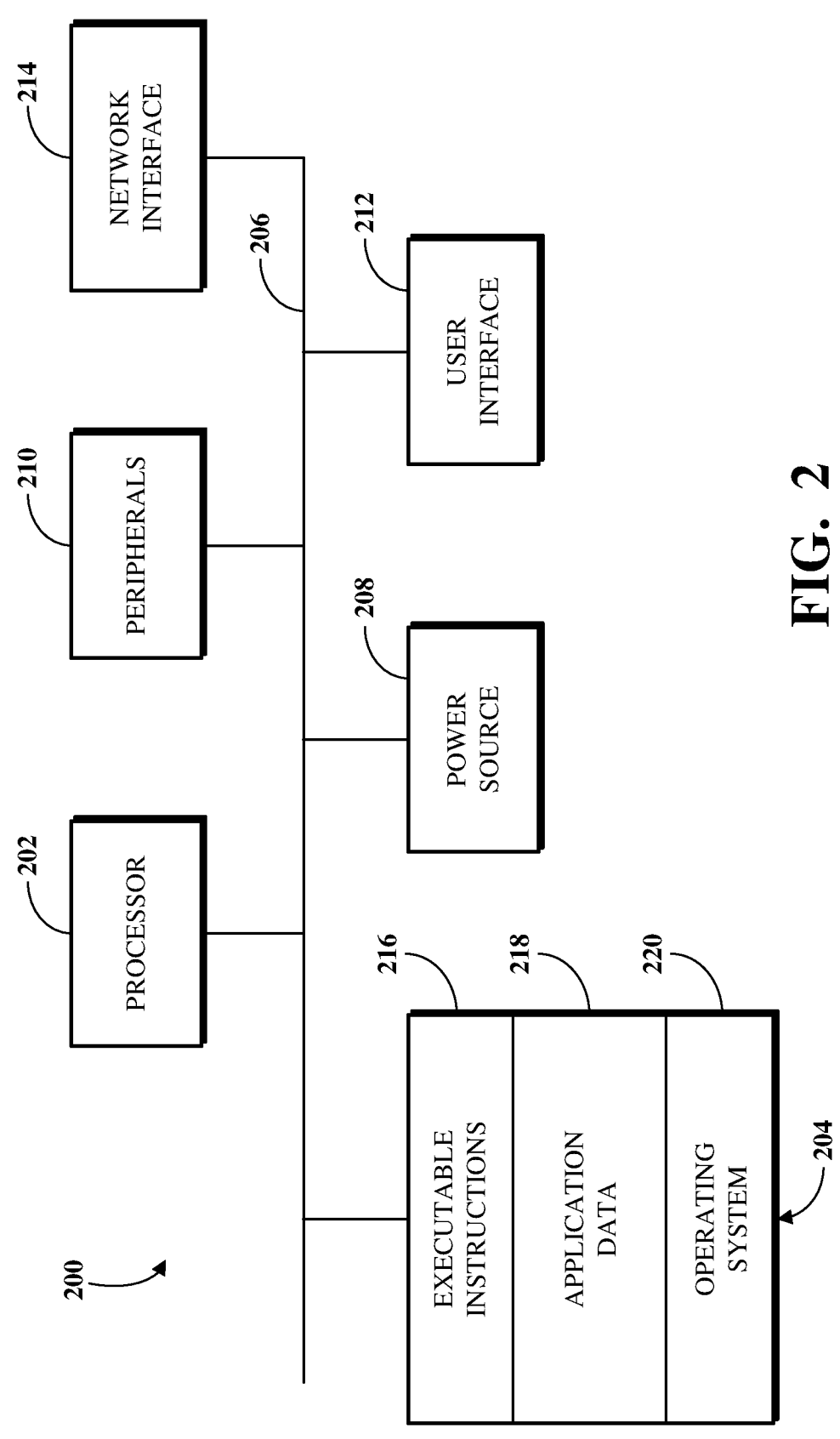
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
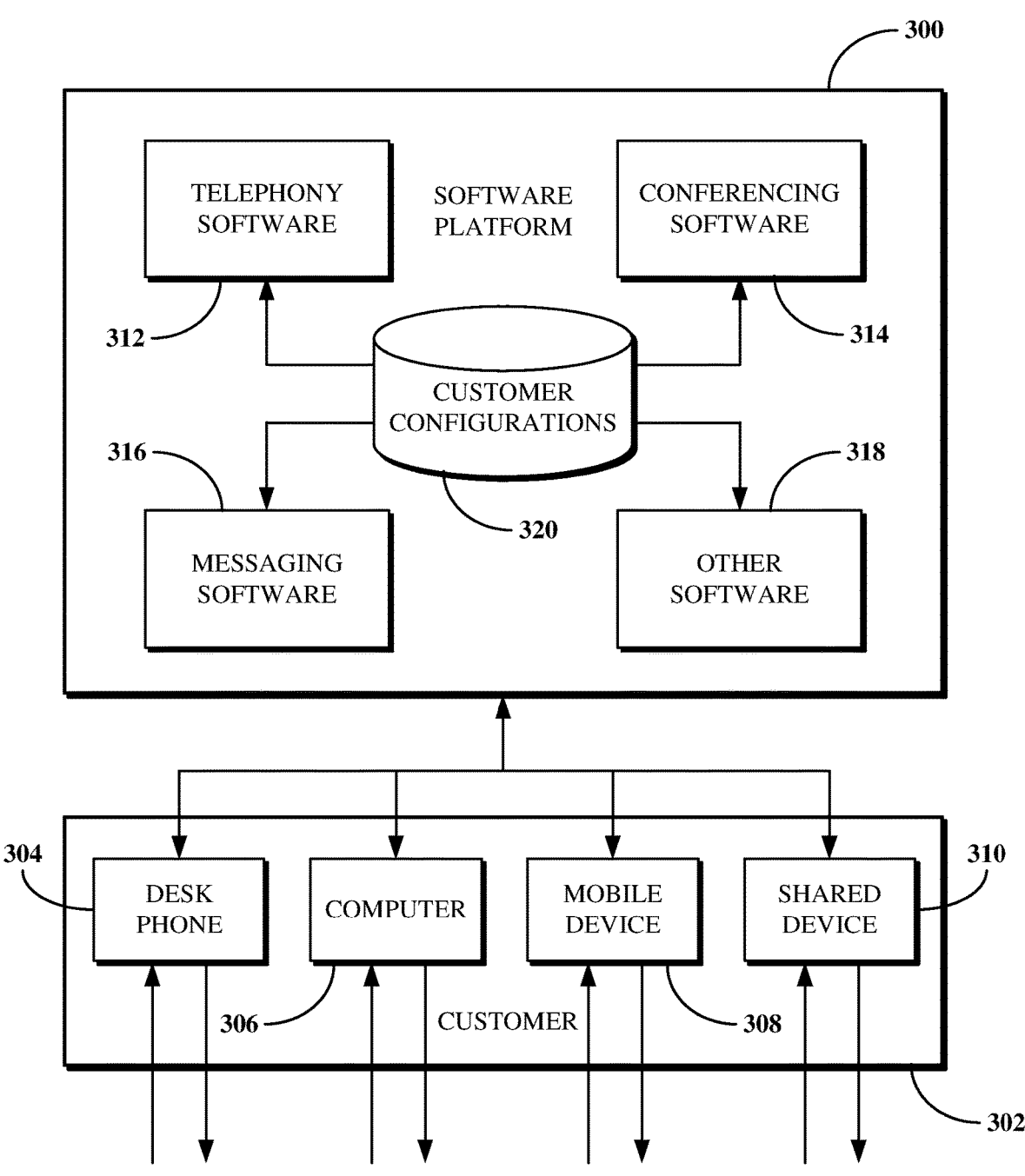
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include communications software, such as for generating internal and external meeting invitations and/or replacing email addresses with project-specific email addresses. In some such cases, the conferencing software 314 may include some or all of the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
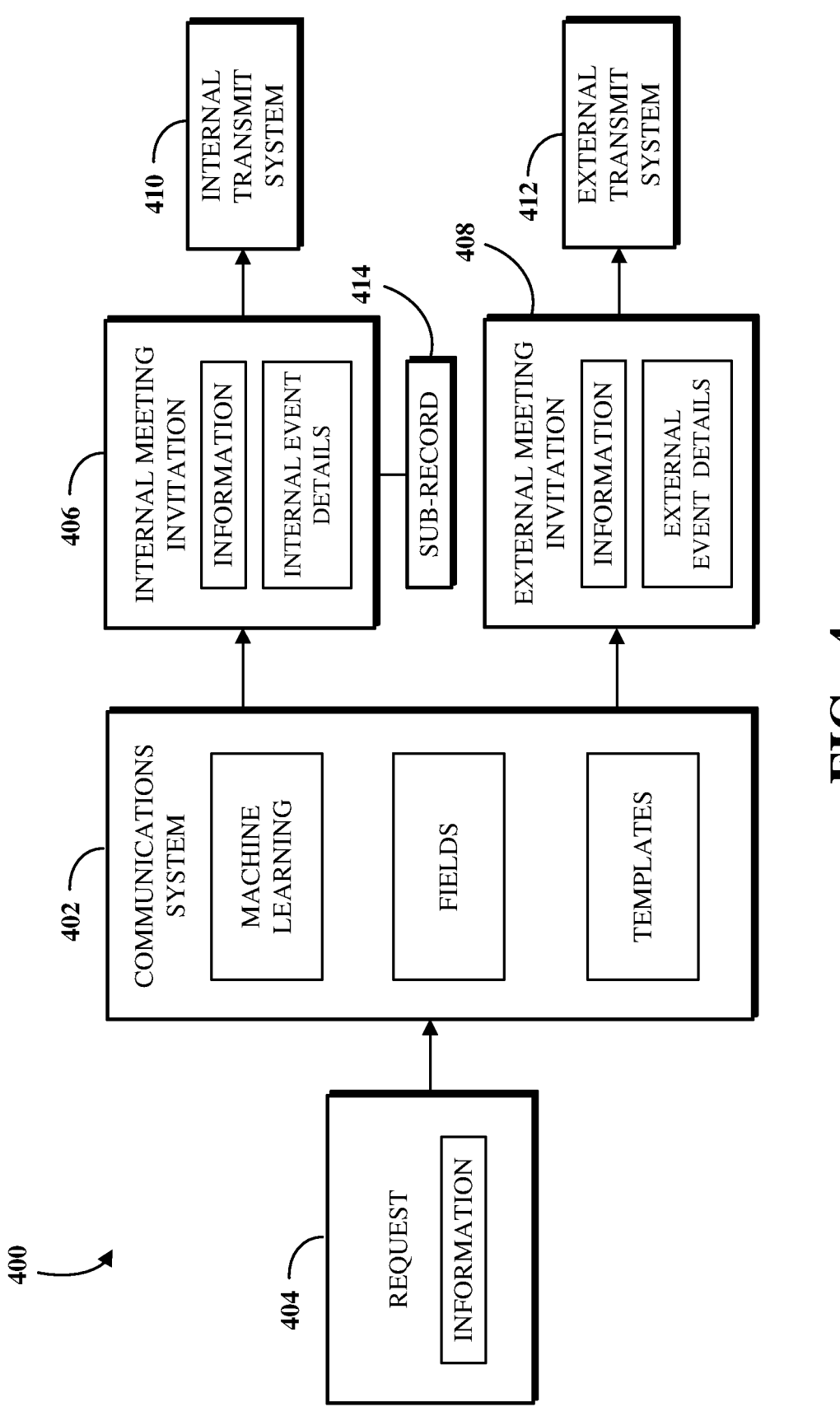
FIG. 4 is a block diagram of an example of a system for generating internal and external meeting invitations.

FIG. 4 is a block diagram of an example of a system 400 for generating internal and external meeting invitations. The system 400 may include a communications system 402. For example, the communications system 402 may be implemented by the other software 318 of FIG. 3. The communications system 402 may receive a request 404 for a meeting event (e.g., input). For example, an internal user (e.g., an individual that part of an internal organization, such as a company, school, group, or other entity) may generate the request 404 through a GUI to provide the input to the communications system 402. The request 404 for the meeting event may include information for a meeting, such as a date, a time, a location (e.g., a physical location and/or a virtual location), and invitees that identify one or more internal users and one or more external users (e.g., an individual that is outside of the internal organization, and may be part of an external organization, such as another company, school, group, or entity).

The communications system 402 can generate, based on the request 404 for the meeting event, an internal meeting invitation 406 and an external meeting invitation 408. The internal meeting invitation 406 may include at least part of the information from the request 404 (e.g., the date, time, and location) and internal event details. For example, the internal event details may include an internally visible title, a link or an attachment that provides private information that is internal to the organization, a link to an application configured to run internal to the organization, and/or information about the external user or external organization. The external meeting invitation 408 may include at least part of the information from the request 404 (e.g., the same date, time, and location) and external event details that are different from the internal event details. For example, the external event details may include an externally visible title, a link or an attachment that provides public information that is external to the organization, a link to an application configured to run external to the organization, and/or information about the internal user or the organization.

The communications system 402 can transmit the internal meeting invitation 406 to the internal user and transmit the external meeting invitation 408 to the external user to invite the internal user and the external user to the same meeting event. For example, the communications system 402 can utilize an internal transmit system 410 to transmit the internal meeting invitation 406 to the internal user (e.g., inside of the internal organization, such as inside of a firewall, within a network domain). In some implementations, the internal transmit system 410 can transmit the internal meeting invitation 406 to the internal user by writing the internal meeting invitation 406 to a digital calendar used by the internal user in the internal organization. The communications system 402 can also utilize an external transmit system 412 to transmit the external meeting invitation 408 to the external user (e.g., outside of the internal organization, such as outside of a firewall, to another network domain). In some implementations, the external transmit system 412 can transmit the external meeting invitation 408 to the external user by emailing a calendar file to the external user at a domain associated with the external organization. The internal transmit system 410 and the external transmit system 412 could be implemented by the other software 318 of FIG. 3.

As a result, the communications system 402 can separate internal and external meeting invitations (e.g., the internal meeting invitation 406 and the external meeting invitation 408) for a same meeting event (e.g., originating from the request 404) to enable deeper insights for internal users versus external users. This may enable a controlled experience that distinguishes between the needs of the internal and external users (e.g., a two-headed meeting invite). For example, the internal meeting invitation 406 may be tailored to internal users to enable the internal users to prepare for the meeting in one way (e.g., to explain a product or service offered by the internal organization), and the external meeting invitation 408 may be tailored to external users to enable the external users to prepare for the same meeting in another way (e.g., to inquire about the product or service on behalf of the external organization). Thus, the communications system 402 can substantiate two types of meeting invitations attached to a same shared time slot and meeting.

With additional reference to FIG. 5, an example of an internal meeting invitation 500 could be generated by the communications system 402. For example, the internal meeting invitation 500 could be the internal meeting invitation 406. The internal meeting invitation 500 may include at least part of the information from the request 404, such as a date (e.g., Apr. 1, 20XX), a time (e.g., 11:00 a.m. Pacific Time), a location (e.g., a virtual location, such as a link to a video conference), and invitees to the meeting. The invitees may include one or more internal users and one or more external users. For example, the invitees could include a first internal user (e.g., an account representative of a provider, having an email address [first internal user]@[provider] .com); a second internal user (e.g., a subject matter expert of the provider, having an email address of [second internal user]@[provider].com); and an external users (e.g., a customer, having an email address of [external user]@[customer].com).

The internal meeting invitation 500 may include internal event details configured for the one or more internal users. The internal event details may be different from external event details configured for the one or more external users. For example, the internal event details may include an internally visible title (e.g., a unique title which is presented to only internal users, such as "Customer's Discovery Call"), a link or an attachment that provides private information that is internal to the organization (e.g., the internal organization's proprietary information, such as a report about the customer and their relative importance, sales figures, or other sensitive data), a link to an application configured to run internal to the organization (e.g., a proprietary tool used by the provider, such as a program configured to run inside of the internal organization's firewall, or within the internal organization's network domain), and/or deeper information about the external user and/or the external organization (e.g., more extensive than the external meeting invitation 408, such as deeper contact information, biographies, and enhanced backgrounds about the external users and/or the external organization); and/or internal notes (e.g., an internal agenda, or notes to one or more of the internal users, such as "this is a new prospective customer.").

With additional reference to FIG. 6, an example of an external meeting invitation 600 could be generated by the communications system 402. For example, the external meeting invitation 600 could be the external meeting invitation 408. Like the internal meeting invitation 500, the external meeting invitation 600 may also include at least part of the information from the request 404, such as the same date (e.g., Apr. 1, 20XX), the same time (e.g., 11:00 a.m. Pacific Time), the same location (e.g., the virtual location, such as the link to the video conference), and the same invitees to the meeting. For example, the invitees could include the first internal user (e.g., the account representative of the provider, having the email address [first internal user]@[provider].com); the second internal user (e.g., the subject matter expert of the provider, having the email address of [second internal user]@[provider].com); and the external users (e.g., the customer, having the email address of [external user]@[customer].com).

The external meeting invitation 600 may include external event details configured for the one or more external users. The external event details may be different from the internal event details. For example, the external event details may include an externally visible title (e.g., a unique title which is presented to only external users, such as "Introduction Call with Possible Service Provider"), a link or an attachment that provides public information that is external to the internal organization (e.g., the internal organization's public information, such as advertising of goods or services offered by the provider), a link to an application configured to run external to the internal organization (e.g., a public tool available on the Internet, configured to run outside of the internal organization's firewall, or outside of the internal organization's network domain), deeper contact information about the internal user and/or the internal organization (e.g., more extensive than the internal meeting invitation 406, such as deeper contact information, biographies, and enhanced backgrounds about the internal users and/or the internal organization), and/or external notes (e.g., an external agenda, or notes to one or more of the external users, such as "thank you for the opportunity to present our service to you.").

The external meeting invitation 600 may be configured differently from the internal meeting invitation 500 of FIG. 5 in a number of ways. For example, while the internal meeting invitation 500 may include a link to an application, the external meeting invitation 600 might not. Also, while the external meeting invitation 600 may include notes, the internal meeting invitation 500 might not. In some implementations, the external meeting invitation 600 can show the external users (e.g., [external user]@[customer].com, being the customer) and the internal user that is the host (e.g., [first internal user]@[provider].com, being the account representative), but might not show other internal users (e.g., [second internal user]@[provider].com, being the subject matter expert). In some implementations, the external meeting invitation 600 can utilize an abstracted, project-specific email address for one or more internal users that is linked to a project record. For example, the communications system 402 could replace, before transmitting the external meeting invitation 600 to the external user, an email address of one or more internal users (e.g., [first internal user]@[provider]

.com, and/or [second internal user]@[provider].com) with a project-specific email address (e.g., [first project]@[provider].com) that is linked to a project record and the internal user (e.g., the first internal user, and/or the second internal user, such as via their email address). For example, the communications system 402 could utilize the communications system 702 of FIG. 7 to perform the replacement. In some cases, the internal meeting invitation 500 and the external meeting invitation 600 can both be visible to internal users, including internal users that are not invitees, via the digital calendar used by the internal users in the internal organization. The external users may be limited to receiving the external meeting invitation 600 (e.g., a digital calendar file associated with the invite, such as an .ICS file), without visibility of the internal meeting invitation 500.

Referring again to FIG. 4, in some implementations, the communications system 402 can predict the internal event details and/or the external event details from the request 404 to generate the internal meeting invitation 406 and/or the external meeting invitation 408. For example, the request 404 could include natural language text, such as an email, report, agenda, or other document. The communications system 402 can invoke a machine learning model to generate the internal event details and/or the external event details based on one or more predictions from the natural language text (e.g., the email, report, agenda, or other document, which could be written by the internal user). The machine learning model could be trained based on historical meeting information associated with one or more of the internal user, the external user, and/or the external organization. For example, the machine learning model can be trained using a training data set including data samples representing parameters for historical meetings, including past invitees and/or past subject matter. The training can be periodic, such as by updating the machine learning model on a discrete time interval basis (e.g., once per week or month), or otherwise. The training data set may derive from multiple invitees (e.g., the first internal user, the second internal user, and the external user) or may be specific to a particular invitee (e.g., the external user). The machine learning model may, for example, be or include one or more of a neural network (e.g., a convolutional neural network, recurrent neural network, deep neural network, or other neural network), decision tree, vector machine, Bayesian network, cluster-based system, genetic algorithm, deep learning system separate from a neural network, or other machine learning model.

In some implementations, a user can provide input, through a GUI, for the request (e.g., manual entry). For example, the communications system 402 can present a GUI to the internal user with fields to be populated. The fields may be used to determine the information, the internal event details, and the external event details. The communications system 402 can receive input by the internal user populating the fields. The communications system 402 can then generate the internal meeting invitation 406 and/or the external meeting invitation 408 based on the fields. In some implementations, a user can provide input based on a template (e.g., templatized entry). For example, the communications system 402 can utilize the template, based on the type of meeting, with pre-populated fields, based on data in the request 404, to generate the internal event details and/or the external event details for the internal meeting invitation 406 and/or the external meeting invitation 408, respectively.

In some implementations, the communications system 402 can generate a sub-record 414 associated with the internal meeting invitation 406. The sub-record 414 may include an additional internal event detail that may apply to one or more internal users. For example, the sub-record 414 could be an invitation to a third internal user (e.g., an alternative subject matter expert of the provider, having the email address of [third internal user]@[provider].com) to attend a selection portion of the meeting. The additional internal event detail could be relevant to only the one or more internal users associated with the sub-record 414. For example, the additional internal event detail could include details about a specific product that the third internal user is to present. Thus, the sub-record 414 could be a sub meeting invitation to another internal user. The sub-record 414 may be linked to the internal meeting invitation 406 via a top level identifier. In some implementations, the communications system 402 can access one or more digital calendars used by the one or more internal users associated with the sub-record 414 to determine the additional internal event detail, such as scheduling information. The communications system 402 can then transmit the sub-record 414 to the one or more internal users associated with the sub-record 414 via the internal transmit system 410.

In some implementations, the communications system 402 can generate a micro-site associated with the internal meeting invitation 406 and/or the external meeting invitation 408. The micro-site may be hosted by website associated with the internal organization (e.g., the internal organization's network domain). For example, contents of the internal meeting invitation 406 and/or the internal meeting invitation 500 (e.g., the information and the internal event details) could be written to an internal micro-site that is accessible by internal users within the internal organization (e.g., a web page hosted on the internal network organization's private Intranet). In some cases, contents of the external meeting invitation 408 or the external meeting invitation 600 (e.g., the information and the external event details) could also be written to the internal micro-site. In another example, contents of the external meeting invitation 408 or the external meeting invitation 600 could be written to an external micro-site that is accessible by external users that are outside of the internal organization (e.g., a web page hosted on the internal network organization's Internet site). In some implementations, the external micro-site could be password protected so that access is limited to the internal users and the external users.

Figure 7:
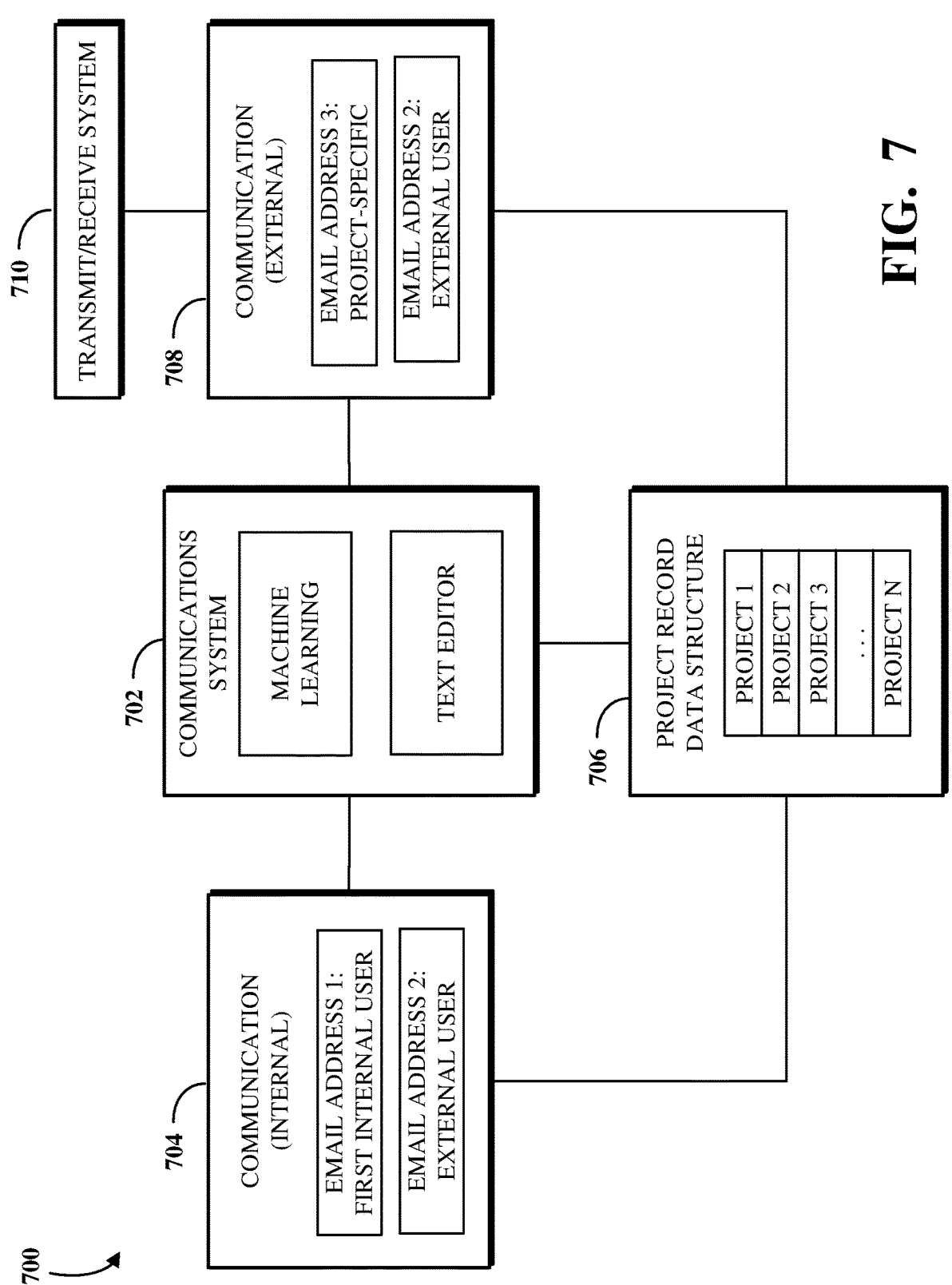
FIG. 7 is a block diagram of an example of a system for replacing email addresses with project-specific email addresses.

FIG. 7 is a block diagram of an example of a system 700 for replacing email addresses with project-specific email addresses. The system 700 may include a communications system 702. For example, the communications system 702 may be implemented by the other software 318 of FIG. 3. In some implementations, aspects of the communications system 402 of FIG. 4 and the communications system 702 may be combined. The communications system 702 may determine, based on a communication 704 between at least a first internal user that is internal to an organization (e.g., an individual that part of the internal organization, such as the company, school, group, or other entity) and an external user that is external to the organization (e.g., an individual that is outside of the internal organization, and may be part of an external organization, such as another company, school, group, or entity), that the communication 704 is associated with a project record in a project record data structure 706. For example, the communication 704 could be a draft message (e.g., an email or meeting invitation) that is internal to the organization (e.g., stored on a server of the internal organization, inside of a firewall or within a network domain) and has not been sent. The communication 704 may include an email address of the first internal user (e.g., "email address 1," which may be a "from" address, such as

[first internal user]@[provider].com, being the account representative) and an email address of the external user (e.g., "email address 2," which may be a "to" address, such as [external user]@[customer].com, being the customer).

The communications system 702 may determine that the communication 704 is associated with the project record (e.g., project 1 of N possible projects, where N is an integer greater than one) in a number of ways. For example, the communications system 702 can identify the external user in the communication 704 (e.g., the email address 2, or the name of the external user) as corresponding to the project record (e.g., the external user may be a tracked contact that is linked to the project record having a project identifier, such as project 1). In another example, the communications system 702 can detect a project identifier associated with a project record in the communication 704 (e.g., the communication 704 may reference project 1). In another example, the communications system 702 can prompt the internal user through a GUI to specify a project record for the communication 704, or to confirm that the communication 704 is associated with a project record that has been identified (e.g., project 1). In some implementations, the communications system 702 can utilize a machine learning model to determine that the communication 704 is associated with a project record. In some cases, the communications system 702 may identify the project record (e.g., project 1) from a plurality of project records that are linked to the same external user (e.g., the customer, having email address 2, may be associated with the multiple projects, one of which being relevant to the communication 704).

The communications system 702 can then replace, in the communication 704 and before transmitting the communication 704, the email address of the first internal user (e.g., email address 1, such as [first internal user]@[provider].com, being the account representative) with a project-specific email address (e.g., "email address 3," such as [first internal user associated with first project]@[provider].com) that is linked to the determined project record (e.g., project 1). Replacing the email address may result in a communication 708 between the project-specific email address (e.g., email address 3) and the external user (e.g., email address 2, such as [external user]@[customer].com, being the customer). For example, the email address of the first internal user may be samsmith@abcdefgcompany.com and the project-specific email address may be samsmith-project1@abcdefgcompany.com. In another example, the email address of the first internal user may be samsmith@abcdefgcompany.com and the project-specific email address may be marketingmanager-project1@abcdefgcompany.com. Thus, the project-specific email address may represent or otherwise indicate or identify the first internal user by name, by job title, or by project role. In yet another example, the email address of the first internal user may be samsmith@abcdefgcompany.com and the project-specific email address may be marketing-project1@abcdefgcompany.com. The specific formatting of the email addresses in the above examples are presented strictly by example, and the implementations of this disclosure are not limiting as to the formatting of email addresses used therewith (e.g., with or without hyphens or other punctuation between elements thereof).

The communication 708 could, for example, be a message (e.g., an email or meeting invitation, based on the communication 704) that is ready to be sent external to the organization (e.g., outside of the internal organization, such as outside of the firewall, to another network domain). The communications system 702 can utilize a transmit/receive system 710 to transmit the communication 708 (from the project-specific email address) to the external user (e.g., outside of the internal organization, such as outside of the firewall, to another network domain, which may be associated with a domain at the external organization). The transmit/receive system 710 could be implemented by the other software 318 of FIG. 3, and/or the external transmit system 412 of FIG. 4. Further, the communication 708 may be copied to the project record (e.g., project 1) in the project record data structure 706.

Replacing the email address with the project-specific email address may serve to notify the first internal user, and in some cases other internal users associated with the project, of information relevant to the project, including replies to the communication 708. For example, a reply that is sent from the external user to the project-specific email address (e.g., addressed to the email address 3, and received by the communications system 702) may be forwarded to the first internal user (e.g., the account representative), and in some cases a second internal user (e.g., a subject matter expert of the provider, having an email address of [second internal user]@[provider].com). For example, the reply may be forwarded by the communications system 702 as an incoming message. In some implementations, the first internal user may be notified of the reply via another modality (e.g., other than email), such as text message or instant message. For example, a reply to the communication 708 could cause a notification to the first internal user via a text message to the first internal user's mobile device and/or an instant message to the first internal user's computer. In some implementations, another notification or reminder may be transmitted to the first internal user, and/or other internal users associated with the project, when a response to the reply is not detected within a predefined period of time. For example, if the external user sends a reply to the project-specific email address, and a response to the reply is not detected within a week, the communications system 702 can transmit to the first internal user, and/or other internal users associated with the project, a reminder to respond to the reply.

The reply may also be copied to the project record (e.g., project 1) in the project record data structure 706. The reply to the project-specific email address may be forwarded to relevant internal users, regardless of a substitution of one internal user for another. For example, a reply that is sent to the project-specific email address, from the external user, could be forwarded to another internal user that may be relevant to the project, such as a third internal user (e.g., the alternative subject matter expert of the provider, having the email address of [third internal user]@[provider].com), when the third internal user joins the project. The reply could also not be sent (omitted from) to an original internal user on the project that may no longer be relevant to the project, such as the second internal user (e.g., the original subject matter expert) when the second internal user leaves the project.

Selective notifications by the communications system 702 can be controlled by updating a notification property of the project-specific email address (e.g., to notify or not notify one more internal users, which may change over time based on their changing relevance to the project). For example, changing the property associated with the project-specific email address can cause the project-specific email address to start or to stop notifying a second internal user, or to substitute notifying one internal user for another. The project-specific email address can also be terminated after a predefined period of time, so that a reply to the communication 708 (addressed to the project-specific email address)

may be undeliverable. For example, changing the property associated with the project-specific email address can terminate the project-specific email address so that the communications system 702 no longer notifies the internal users. As a result, the project-specific email address may provide an ephemeral alias for the internal users (e.g., task aliases) that may be included in communications, such as the communication 708. The task alias may enable the internal users to align in their support of external users, and/or may enable the internal users to efficiently enter and/or exit projects supporting the external users without negatively impacting the project.

In some implementations, the communications system 702 can invoke a text editor. The text editor can be utilized to replace, in the communication 704 and before transmitting the communication 704, the email address of the first internal user (e.g., email address 1, such as [first internal user]@[provider].com, being the account representative) with the project-specific email address (e.g., "email address 3," such as [first internal user associated with first project]@[provider].com). The text editor can also be utilized to change contact information associated with the first internal user in the communication 704. For example, a body of the communication 704 may include a telephone number or email address written in the message. The communications system 702 can utilize the text editor to remove the telephone number or email address, and/or to add a project-specific telephone number or the project-specific email address to the body of the communication 708.

In some implementations, the communications system 702 can predict a second internal user (e.g., the subject matter expert of the provider) to notify from information in the communication (e.g., the communication 704). For example, the communication could include natural language text, such as the body of an email, or the attachment or linking of a report or other document. The communications system 402 can invoke the machine learning model to predict the second internal user to notify based on the natural language text. The machine learning model could be trained based on historical communications associated with the external user, the external organization, the project, and/or the internal users. For example, the machine learning model can be trained using a training data set including data samples representing parameters for historical communications, including communications linked to past projects including the external user and/or the external organization. The training can be periodic, such as by updating the machine learning model on a discrete time interval basis (e.g., once per week or month), or otherwise. The training data set may derive from multiple communications or may be specific to a particular communication (e.g., the communication 704). The machine learning model may, for example, be or include one or more of a neural network (e.g., a convolutional neural network, recurrent neural network, deep neural network, or other neural network), decision tree, vector machine, Bayesian network, cluster-based system, genetic algorithm, deep learning system separate from a neural network, or other machine learning model.

In some implementations, before transmitting the communication 704, the communications system 702 can output a message to a GUI indicating that the communication 704 is associated with a project record (e.g., project 1). The communications system 702 receiving, before replacing the email address of the first internal user with the project-specific email address, can receive an indication through the GUI to perform the replacing. For example, the first internal user might reject the replacing of their email address with the project-specific email address when the communication 704 is a personal communication (e.g., not associated with the project). The first internal user might later accept the replacing when a later communication begins to involve the project. As a result, the first internal user can control when replacing email addresses with project-specific email addresses occurs via a GUI.

To further describe some implementations in greater detail, reference is next made to examples of techniques which may be performed using a system for generating internal and external meeting invitations and/or replacing email addresses with project-specific email addresses. FIG. 8 is a flowchart of an example of a technique 800 for generating internal and external meeting invitations. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof. The technique 800 may require authorization of an account administrator prior to use.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a system may receive a request for a meeting event having information that identifies an internal user that is internal to an organization and an external user that is external to the organization. For example, the communications system 402 of FIG. 4 can receive the request 404 for a meeting event having information that identifies an internal user that is internal to an organization and an external user that is external to the organization. The communications system 402 can receive the request through a GUI used by the internal user. The request for the meeting event may include information for a meeting, such as a date, a time, a location (e.g., a physical location and/or a virtual location), and invitees, including one or more internal users and one or more external users (e.g., an individual that is outside of the internal organization, and may be part of an external organization, such as another company, school, group, or entity).

At 804, the system may generate, based on the request for the meeting event, an internal meeting invitation and an external meeting invitation, the internal meeting invitation including at least part of the information and internal event details and the external meeting invitation including at least part of the information and external event details that are different from the internal event details. For example, the communications system 402 can generate, based on the request for the meeting event, the internal meeting invitation 406 and the external meeting invitation 408 of FIG. 4. The internal meeting invitation can include the information and internal event details. For example, the internal event details may include an internally visible title, a link or an attachment that provides private information that is internal to the organization, a link to an application configured to run internal to the organization, and/or information about the external user or external organization. The external meeting invitation can include the information and external event details that are different from the internal event details. For example, the external event details may include an externally visible title, a link or an attachment that provides public information that is external to the organization, a link to an application configured to run external to the organization, and/or information about the internal user or the organization.

At 806, the system may transmit the internal meeting invitation to the internal user and the external meeting invitation to the external user. For example, the communications system 402 can utilize the internal transmit system 410 of FIG. 4 to transmit the internal meeting invitation to the internal user (e.g., inside of the internal organization, such as inside of a firewall, within a network domain). In some implementations, transmitting the internal meeting invitation may include writing the internal meeting invitation to a digital calendar used by the internal user in the internal organization. The communications system can also utilize the external transmit system 412 of FIG. 4 to transmit the external meeting invitation to the external user (e.g., outside of the internal organization, such as outside of a firewall, to another network domain). In some implementations, transmitting the external meeting invitation may include emailing a calendar file to the external user at a domain associated with the external organization.

FIG. 9 is a flowchart of an example of a technique for replacing email addresses with project-specific email addresses. The technique 900 can be executed using computing devices, such as the systems, hardware, and software described with respect to FIGS. 1-7. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof. The technique 900 may require authorization of an account administrator prior to use.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a system may determine, based on a communication between at least a first internal user that is internal to an organization and an external user that is external to the organization, that the communication is associated with a project record in a project record data structure. For example, the communications system 702 of FIG. 7 can determine, based on the communication 704 between at least a first internal user that is internal to the organization (e.g., an individual that part of the internal organization, such as the company, school, group, or other entity) and an external user that is external to the organization (e.g., an individual that is outside of the internal organization, and may be part of an external organization, such as another company, school, group, or entity), that the communication is associated with a project record. The communications system can determine that the communication is associated with the project record in a number of ways. For example, the communications system can identify the external user, in the communication, in the project record (e.g., the external user may be a tracked contact that is linked to the project record via a project identifier). In another example, the communications system can identify a project identifier associated with the project record in the communication. In another example, the communications system can prompt the internal user through a GUI to confirm that the communication is associated with the project record before proceeding further. In some implementations, the communications system can utilize a machine learning model to determine that the communication is associated with the project record.

At 904, the system may replace, before transmitting the communication, an email address of the first internal user with a project-specific email address that is linked to the project record and the first internal user. For example, the communications system 702 can replace, before transmitting the communication, an email address of the first internal user with a project-specific email address that is linked to the project record and the first internal user. Replacing the email address may result in a communication between the project-specific email address and the external user that may be transmitted, such as the communication 708 of FIG. 7. For example, the communication could be a message (e.g., an email or meeting invitation, based on a draft communication, such as the communication 704) that is ready to be sent external to the organization.

At 906, the system may transmit the communication from the project-specific email address to the external user. For example, the communications system 702 can utilize the transmit/receive system 710 of FIG. 7 to transmit the communication from the project-specific email address to the external user (e.g., outside of the internal organization, such as outside of the firewall, to another network domain, which may be associated with a domain at the external organization). Further, the communications system 702 can copy the communication that is transmitted to the project record in the project record data structure.

The implementations of this disclosure correspond to methods, non-transitory computer readable media, apparatuses, systems, devices, and the like. In some implementations, a method comprises: receiving a request for a meeting event having information that identifies an internal user that is internal to an organization and an external user that is external to the organization; generating, based on the request, an internal meeting invitation and an external meeting invitation, the internal meeting invitation including at least part of the information and internal event details and the external meeting invitation including at least part of the information and external event details; and transmitting the internal meeting invitation to the internal user and the external meeting invitation to the external user. In some implementations, a non-transitory computer readable medium stores instructions operable to cause one or more processors to perform operations comprising: receiving a request for a meeting event having information that identifies an internal user that is internal to an organization and an external user that is external to the organization; generating, based on the request, an internal meeting invitation and an external meeting invitation, the internal meeting invitation including at least part of the information and internal event details and the external meeting invitation including at least part of the information and external event details; and transmitting the internal meeting invitation to the internal user and the external meeting invitation to the external user. In some implementations, an apparatus comprises a memory and a processor configured to execute instructions stored in the memory to: receive a request for a meeting event having information that identifies an internal user that is internal to an organization and an external user that is external to the organization; generate, based on the request, an internal meeting invitation and an external meeting invitation, the internal meeting invitation including at least part of the information and internal event details and the external meeting invitation including at least part of the information and external event details; and transmit the internal meeting invitation to the internal user and the external meeting invitation to the external user.

In some implementations of the method, non-transitory computer readable medium, or apparatus, the method comprises, the operations comprise, and the processor is configured to execute the instructions for training a machine learning model to generate the internal meeting invitation and the external meeting invitation based on historical meeting information associated with at least one of the internal user or the external user.

In some implementations of the method, non-transitory computer readable medium, or apparatus, generating the internal meeting invitation and the external meeting invitation comprises: receiving natural language text; and predicting the internal event details and the external event details from the natural language text.

In some implementations of the method, non-transitory computer readable medium, or apparatus, the method comprises, the operations comprise, and the processor is configured to execute the instructions for generating, in connection with the internal meeting invitation, a sub-record including an additional internal event detail; and transmitting the sub-record to a second internal user.

In some implementations of the method, non-transitory computer readable medium, or apparatus, transmitting the internal meeting invitation to the internal user and the external meeting invitation to the external user comprises: writing the internal meeting invitation to a digital calendar used by the internal user; and emailing a calendar file to the external user.

In some implementations of the method, non-transitory computer readable medium, or apparatus, transmitting the external meeting invitation to the external user comprises: replacing an email address of the internal user with a project-specific email address that is linked to a project record and the internal user.

In some implementations of the method, non-transitory computer readable medium, or apparatus, the method comprises, the operations comprise, and the processor is configured to execute the instructions for generating the internal event details to include an internally visible title and the external event details to include an externally visible title.

In some implementations of the method, non-transitory computer readable medium, or apparatus, the method comprises, the operations comprise, and the processor is configured to execute the instructions for generating the internal event details to include at least one of a first link or a first attachment that provides private information internal to the organization and the external event details to include at least one of a second link or a second attachment that provides public information external to the organization.

In some implementations of the method, non-transitory computer readable medium, or apparatus, the method comprises, the operations comprise, and the processor is configured to execute the instructions for transmitting an .ICS file to the external user.

In some implementations of the method, non-transitory computer readable medium, or apparatus, the information includes a date, a time, and at least one of a physical location or a virtual location for the meeting event.

In some implementations of the method, non-transitory computer readable medium, or apparatus, the method comprises, the operations comprise, and the processor is configured to execute the instructions for receiving input from the internal user that specifies the information, the internal event details, and the external event details.

In some implementations of the method, non-transitory computer readable medium, or apparatus, the method comprises, the operations comprise, and the processor is configured to execute the instructions for utilizing a template to generate the internal meeting invitation and the external meeting invitation.

In some implementations of the method, non-transitory computer readable medium, or apparatus, the method comprises, the operations comprise, and the processor is configured to execute the instructions for generating the internal event details to include a link to an application configured to run internal to the organization.

In some implementations of the method, non-transitory computer readable medium, or apparatus, the method comprises, the operations comprise, and the processor is configured to execute the instructions for generating the internal event details to include information about the external user and the external event details to include information about the internal user.

In some implementations of the method, non-transitory computer readable medium, or apparatus, the method comprises, the operations comprise, and the processor is configured to execute the instructions for invoking a machine learning model to generate the internal meeting invitation and the external meeting invitation, wherein the machine learning model predict the internal event details and the external event details from natural language text.

In some implementations of the method, non-transitory computer readable medium, or apparatus, the method comprises, the operations comprise, and the processor is configured to execute the instructions for invoking a machine learning model to generate the internal meeting invitation and the external meeting invitation, wherein the machine learning model predicts the internal event details and the external event details based on historical meeting information.

In some implementations of the method, non-transitory computer readable medium, or apparatus, the method comprises, the operations comprise, and the processor is configured to execute the instructions for generating a sub-record associated with the internal meeting invitation, the sub-record including an additional internal event detail; and transmitting the sub-record to a second internal user.

In some implementations of the method, non-transitory computer readable medium, or apparatus, the method comprises, the operations comprise, and the processor is configured to execute the instructions for replacing, before transmitting the external meeting invitation to the external user, an email address of the internal user with a project-specific email address that is linked to a project record and the internal user.

In some implementations, a method comprises: determining, based on a communication between at least a first internal user that is internal to an organization and an external user that is external to the organization, that the communication is associated with a project record having a project identifier that is stored in a project record data structure; replacing, before transmitting the communication, an email address of the first internal user with a project-specific email address that is linked to the project record and the first internal user; and predicting, using a machine learning model, a second internal user to notify from information in the communication, wherein the machine learning model is trained based on historical communications associated with the project record and the second internal user, and the second internal user is not an existing recipient of the communication. In some implementations, a non-transitory computer readable medium stores instructions operable to cause one or more processors to perform operations comprising: determining, based on a communication between at least a first internal user that is internal to an organization and an external user that is external to the organization, that the communication is associated with a project record having a project identifier that is stored in a project record data structure; replacing, before transmitting the communication, an email address of the first internal user with a project-specific email address that is linked to the project record and the first internal user; and predicting, using a machine learning model, a second internal user to notify from information in the communication, wherein the machine learning model is trained based on historical communications associated with the project record and the second internal user, and the second internal user is not an existing recipient of the communication. In some implementations, an apparatus comprises a memory and a processor configured to execute instructions stored in the memory to: determine, based on a communication between at least a first internal user that is internal to an organization and an external user that is external to the organization, that the communication is associated with a project record having a project identifier that is stored in a project record data structure; replace, before transmitting the communication, an email address of the first internal user with a project-specific email address that is linked to the project record and the first internal user; and predict, using a machine learning model, a second internal user to notify from information in the communication, wherein the machine learning model is trained based on historical communications associated with the project record and the second internal user, and the second internal user is not an existing recipient of the communication.

In some implementations of the method, non-transitory computer readable medium, or apparatus, the method comprises, the operations comprise, and the processor is configured to execute the instructions for transmitting the communication from the project-specific email address to the external user; and copying the communication to the project record.

In some implementations of the method, non-transitory computer readable medium, or apparatus, the method comprises, the operations comprise, and the processor is configured to execute the instructions for receiving a reply to the communication from the external user; and forwarding the reply to the email address of the first internal user and a second email address of a second internal user.

In some implementations of the method, non-transitory computer readable medium, or apparatus, the method comprises, the operations comprise, and the processor is configured to execute the instructions for terminating the project-specific email address after a predefined period of time to cause a reply to the communication that is addressed to the project-specific email address to be undeliverable.

In some implementations of the method, non-transitory computer readable medium, or apparatus, the method comprises, the operations comprise, and the processor is configured to execute the instructions for invoking a text editor to change contact information associated with the first internal user in the communication.

In some implementations of the method, non-transitory computer readable medium, or apparatus, the method comprises, the operations comprise, and the processor is configured to execute the instructions for outputting a message to a graphical user interface (GUI) indicating that the communication is associated with the project record; and receiving, before replacing the email address of the first internal user with the project-specific email address, an indication through the GUI to perform the replacing.

In some implementations of the method, non-transitory computer readable medium, or apparatus, the method comprises, the operations comprise, and the processor is configured to execute the instructions for changing, after transmitting the communication, a property associated with the project-specific email address to cause the project-specific email address to stop notifying the first internal user.

In some implementations of the method, non-transitory computer readable medium, or apparatus, the method comprises, the operations comprise, and the processor is configured to execute the instructions for changing, after transmitting the communication, a property associated with the project-specific email address to cause the project-specific email address to start notifying a second internal user.

In some implementations of the method, non-transitory computer readable medium, or apparatus, the method comprises, the operations comprise, and the processor is configured to execute the instructions for predicting a second internal user to notify from information in the communication.

In some implementations of the method, non-transitory computer readable medium, or apparatus, determining that the communication is associated with the project record comprises: identifying the external user in the project record.

In some implementations of the method, non-transitory computer readable medium, or apparatus, the method comprises, the operations comprise, and the processor is configured to execute the instructions for determining that the external user is a tracked contact that is linked to the project record via a project identifier.

In some implementations of the method, non-transitory computer readable medium, or apparatus, the method comprises, the operations comprise, and the processor is configured to execute the instructions for identifying the project record from a plurality of project records that are linked to the external user.

In some implementations of the method, non-transitory computer readable medium, or apparatus, a reply to the communication causes a notification to the first internal user via a text message.

In some implementations of the method, non-transitory computer readable medium, or apparatus, the method comprises, the operations comprise, and the processor is configured to execute the instructions for changing, after transmitting the communication, a property associated with the project-specific email address to cause the project-specific email address to substitute the first internal user for a second internal user.

In some implementations of the method, non-transitory computer readable medium, or apparatus, the method comprises, the operations comprise, and the processor is configured to execute the instructions for receiving a reply to the communication; and transmitting a notification to the first internal user when a response to the reply is not detected within a predefined period of time.

In some implementations of the method, non-transitory computer readable medium, or apparatus, the method comprises, the operations comprise, and the processor is configured to execute the instructions for training a machine learning model to predict a second internal user to notify based on historical communications.

In some implementations of the method, non-transitory computer readable medium, or apparatus, the communication is at least one of an email or a meeting invitation.

In some implementations of the method, non-transitory computer readable medium, or apparatus, the method comprises, the operations comprise, and the processor is configured to execute the instructions for changing, before transmitting the communication, contact information associated with the first internal user in the communication.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
determining, based on a communication between at least a first internal user that is internal to an organization and an external user that is external to the organization, that the communication is associated with a project record having a project identifier that is stored in a project record data structure;
replacing, based on determining that the communication is associated with the project record, an email address of the first internal user with a project-specific email address that is linked to the project record and the first internal user;
predicting, using a machine learning model, a second internal user to notify based on information in the communication and a role of the second internal user associated with the project record, wherein the machine learning model is trained based on historical communications associated with the project record and the second internal user, and the second internal user is not an existing recipient of the communication;
transmitting, after predicting the second internal user, the communication to at least the external user and the second internal user; and
updating, based on transmitting the communication to the second internal user, a property associated with the project-specific email address to cause the project-specific email address to notify the first internal user and the second internal user of a reply to the communication.

2. The method of claim 1, comprising:
copying the communication to the project record.

3. The method of claim 1, comprising:
receiving a reply to the communication from the external user; and
forwarding the reply to the email address of the first internal user and a second email address of a third internal user.

4. The method of claim 1, comprising:
terminating the project-specific email address after a predefined period of time to cause a reply to the communication that is addressed to the project-specific email address to be undeliverable.

5. The method of claim 1, comprising:
invoking a text editor to change contact information associated with the first internal user in the communication.

6. The method of claim 1, comprising:
outputting a message to a graphical user interface (GUI) indicating that the communication is associated with the project record; and
receiving, before replacing the email address of the first internal user with the project-specific email address, an indication through the GUI to perform the replacing.

7. The method of claim 1, comprising:
changing, after transmitting the communication, a property associated with the project-specific email address to cause the project-specific email address to stop notifying the first internal user.

8. The method of claim 1, comprising:
changing, after transmitting the communication, a property associated with the project-specific email address to cause the project-specific email address to start notifying a third internal user.

9. The method of claim 1, wherein predicting the second internal user to notify comprises:
using the machine learning model to predict the second internal user to notify from natural language text in the communication.

10. The method of claim 1, wherein determining that the communication is associated with the project record comprises:
identifying the external user in the project record.

11. An apparatus, comprising:
a memory; and
a processor configured to execute instructions stored in the memory to:
determine, based on a communication between at least a first internal user that is internal to an organization and an external user that is external to the organization, that the communication is associated with a project record having a project identifier that is stored in a project record data structure;
replace, based on determining that the communication is associated with the project record, an email address of the first internal user with a project-specific email address that is linked to the project record and the first internal user;
predict, using a machine learning model, a second internal user to notify based on information in the communication and a role of the second internal user associated with the project record, wherein the machine learning model is trained based on historical communications associated with the project record and the second internal user, and the second internal user is not an existing recipient of the communication;
transmit, after predicting the second internal user, the communication to at least the external user and the second internal user; and
update, based on transmitting the communication to the second internal user, a property associated with the project-specific email address to cause the project-specific email address to notify the first internal user and the second internal user of a reply to the communication.

12. The apparatus of claim 11, wherein the processor is configured to execute the instructions to:
determine that the external user is a tracked contact that is linked to the project record via the project identifier.

13. The apparatus of claim 11, wherein the processor is configured to execute the instructions to:
identify the project record from a plurality of project records that are linked to the external user.

14. The apparatus of claim 11, wherein a reply to the communication causes a notification to the first internal user via a text message.

15. The apparatus of claim 11, wherein the processor is configured to execute the instructions to:

change, after transmitting the communication, a property associated with the project-specific email address to cause the project-specific email address to substitute the first internal user for a third internal user.

16. A non-transitory computer readable medium storing instructions operable to cause one or more processors to perform operations comprising:

determining, based on a communication between at least a first internal user that is internal to an organization and an external user that is external to the organization, that the communication is associated with a project record having a project identifier that is stored in a project record data structure;

replacing, based on determining that the communication is associated with the project record, an email address of the first internal user with a project-specific email address that is linked to the project record and the first internal user;

predicting, using a machine learning model, a second internal user to notify based on information in the communication and a role of the second internal user associated with the project record, wherein the machine learning model is trained based on historical communications associated with the project record and the second internal user, and the second internal user is not an existing recipient of the communication;

transmitting, after predicting the second internal user, the communication to at least the external user and the second internal user; and updating, based on transmitting the communication to the second internal user, a property associated with the project-specific email address to cause the project-specific email address to notify the first internal user and the second internal user of a reply to the communication.

17. The non-transitory computer readable medium storing instructions of claim 16, wherein the operations comprise:

receiving a reply to the communication; and transmitting a notification to the first internal user when a response to the reply is not detected within a predefined period of time.

18. The non-transitory computer readable medium storing instructions of claim 16, wherein the operations comprise:

training the machine learning model using a training data set including data samples representing parameters for the historical communications.

19. The non-transitory computer readable medium storing instructions of claim 16, wherein the communication is at least one of an email or a meeting invitation.

20. The non-transitory computer readable medium storing instructions of claim 16, wherein the operations comprise:

changing, before transmitting the communication, contact information associated with the first internal user in the communication.

* * * * *